United States Patent Office 3,091,442
Patented May 28, 1963

3,091,442
KILN CONTROL METHOD AND APPARATUS
John R. Romig, Rialto, and Joseph H. Herz, Redlands, Calif., assignors to California Portland Cement Co., Los Angeles, Calif., a corporation of California
Filed Mar. 14, 1961, Ser. No. 95,697
19 Claims. (Cl. 263—32)

This invention relates generally to the kiln treatment of calcareous materials, and more particularly concerns a process and apparatus for increasing the efficiency of kiln operation.

It has long been the desire of kiln operators to achieve uniformity of operation of rotary kilns producing such materials as Portland cement clinker, lime, and similar products. With the advent of modern day large size and high capacity rotary cement kilns, characterized as having critical operating conditions which often cause non-equilibrium performance with resultant lowered efficiencies and inferior quality products, the problems associated with variable operation have become more acute, and the desirability of achieving uniformity of operation has become more and more necessary. Furthermore, controllable operation of cement kilns, in terms of predictability of results, including clinker quality, which flow from given changes in parameters associated with kiln operation, is a necessary prerequisite to the accomplishment of automation of such operation, as by means of computers and other electronic or mechanical control devices.

Reduced to simple terms, a rotary kiln for producing cement clinker is a counterflow heat exchanger which also serves as a reactor. The kiln is usually in the form of an elongated tubular body which is tilted from the horizontal and is rotated slowly about its axis. Materials to be dried, heated, calcined, fused and formed into clinker are introduced into the higher end of the kiln, from which point they slowly travel along the length of the kiln in response to rotation thereof and to other internal causes therein. Most of the heat which is associated with the kiln process is derived from the combustion of fuel such as natural gas, fuel oil, or powdered coal or coke; the fuel being ejected into hot air flowing into the lower elevation end of the kiln. The fuel and air mixture is ignited upon being heated to the flash point, with the result that a large combustion flame is produced near the lower elevation end of the kiln and the resulting hot gaseous products of combustion flow "upstream" in the kiln in countercurrent relation to the flow of solid materials therein, with heat exchange or transfer taking place generally throughout the length of the kiln.

Many interrelated variables affect kiln operation, including the chemical composition and the rate of feed of raw materials to the kiln, the speed of rotation of the kiln, the physical dimensions thereof including kiln length and inside bore diameter, the temperature distribution in the kiln, and the feed of air and combustibles to the kiln. Added to these variables are the chemical and physical reactions undergone by the materials in the kiln, and which are subject to change, as for example the fluidization or ebullition of materials at elevated temperatures, occurring prior to the exothermic reaction undergone by the materials which produces additional heat in the kiln, changing in such fluidization affecting the rate of exothermic reaction and thereby contributing to major changes in temperature conditions in and along the kiln length.

Having in mind the foregoing, the present invention is in part based upon the discovery that adjustment or control of the combustion parameter in relation to temperature conditions near the lower elevation or downstream end of the kiln makes possible the bringing under control of the temperature and countercurrent movement of materials, particularly within and following the fluidization zone of the kiln. Such control of materials temperature and flow is significant in what may be termed the "loss of the kiln" is a major problem resulting from the non-uniform flow of materials through the kiln, and particularly within and following the fluidization zone. Thus, for example, the speeding up and slowing down of the kiln rotary speed in an effort to control or counter undesirable fluctuations in the temperature and flow of materials within and following the fluidization zone can, and frequently does, result in the formation of rings or bulges of hardened materials within the kiln acting to interrupt or vary the flow of the materials therethrough. Further, the temperature conditions may be so changed that the clinker production quality deteriorates and unusable clinker is formed.

More specifically, the present invention concerns the insight or discovery that an increased tendency for materials to move downstream in response to fluidization tending to disturb uniformity of heat transfer in such manner as to increase the tendency for the materials to so move downstream, may be effectively countered by adjusting the combustion to vary the regional location within the kiln at which the hot gas reaches temperatures in excess of the materials maximum temperature. For example, the combustion may be adjusted by effecting an increase in the temperature of the air passing into the kiln, which in turn causes combustion initiation at a point closer to the lower elevation end of the kiln, which in turn displaces the gas temperature profile along the kiln toward that lower elevation end, thereby decreasing the rate of materials movement downstream or toward the lower end of the kiln in response to fluidization.

One method by which controlled heating of the intake air may be brought about is by controllably combusting a side stream of fuel to produce heat varying the temperature of the air before it flows into the kiln. Specifically, an auxiliary fuel burner may be located in the path of air flowing to the kiln, which air has been preheated by flowing through or in heat transfer relation with a bed of hot clinker discharged from the kiln. It is found that air flowing to the kiln from the clinker cooler will vary in temperature depending upon the clinker bed thickness and other conditions, and in accordance with the invention the temperature of the air so supplied may be made uniform or changed as desired by controlling the fuel delivery to the auxiliary burner, thereby to modify or eliminate adverse effects upon kiln operation which might otherwise result from uncontrolled variable heating of the air supply by the clinker bed. Also, the clinker bed thickness may itself be controlled to obtain desirable preheat of the air, prior to final control of the air temperature by the auxiliary burner. Furthermore, in accordance with the invention, the delivery of fuel to the auxiliary burner may be controlled as described above to counter tendencies for the material within the kiln to move with non-uniform flow rates as respects selected points in the kiln, and particularly the critical fluidization and exothermic zones therein.

As will appear, the teachings of the present invention enable substantial improvements in kiln operation, including higher unit production rates, lower unit fuel consumption, the reduction or elimination of rings in the kiln, the production of uniform product quality and size, the enablement of increased refractory brick life, the diminishing of the dust content of exit gases with resultant cleaner stacks, the increasing stabilization of the clinker cooler, lower gas volumes in mechanical precipitators and stacks per unit of production, and very importantly, the facilitation of automated kiln operation and particularly start-ups.

These and other objects of the invention, as well as the details of an illustrative embodiment, will be more fully understood from the following detailed description of the drawings, in which.

Before referring to FIG. 1, reference will first be made to FIG. 2, wherein a rotary kiln is generally indicated at 10 as having elongated tubular shape and as being inclined from the horizontal. Raw materials are fed at 11 into the upstream open end 12 of the kiln which projects into a housing 13. The raw materials travel lengthwise downstream through the kiln, principally in response to rotation thereof, which may be effected by any suitable means such as is generally indicated at 14. Furthermore, the kiln rotary speed may be controlled, as desired, and in the past it has been generally the practice to attempt to control materials flow within the kiln by changing the speed of kiln rotation.

After passing downstream through the kiln, the materials discharge as clinker shown dropping at 15 within hood 16 into which the open downstream end 17 of the kiln projects. The clinker falls downwardly upon a grate means 18, where the clinker is retained in heat transfer relation with air stream moving upwardly as indicated at 19 and 20 and through the clinker bed 21. It will be understood that the clinker bed slowly travels along the length of the grate 18, which may be moved as by means of the drive generally shown at 22. The grate 18 and and clinker bed 21 are confined within a clinker cooler housing 23 having an entrance at 24 for air delivered through duct 25, a stack 26 remote from the hood 16, and a clinker discharge outlet 27. Merely for purpose of illustration, the grate 18 is shown as supported on pivoted links 28 accommodating arcuate movement of the grate in response to operation of the drive means 22. The latter may include a motor 29 having a shaft 30, a coupling 31, another shaft 32 for driving the crank 33, and a link 34 connected between the crank and the grate. Also, the air duct 25 is shown as supplied with air by a suitable blower 35 through a damper 36.

In operation, air delivered through the duct 25 passes upwardly through the clinker bed 21 for the purpose of preheating the air and cooling the clinker, following which the air flows upwardly through the hood 16 and into the downstream end of the kiln. Fuel is delivered to the downstream end of the kiln through a nozzle 37, the fuel becoming ignited for combustion with the air oxygen at a point 38. The fuel which may comprise natural gas, oil, powdered coal, or any suitable flowable combustible, is typically supplied to the nozzle 37 through a conduit 39.

If natural gas is used, it may be supplied through an auxiliary line 40 into which a valve 41 and orifice meter 42 are connected. If oil or powdered coke or coal are used, they may be supplied to line 39 through suitable inlets, and primary air may be delivered to the conduit 39 through a line 43 into which a valve 44 is connected, a suitable blower 45 being shown for delivering primary air at desired pressure and volume to the conduit 39.

Merely by way of illustration as respects typical kiln operation, reference will now be made to the operation of a Portland cement dry process rotary kiln 11 feet in diameter and 350 feet long. Assumed conditions and the calculated heat balance are as follows:

| | |
|---|---|
| Production unit | 1 bbl. clinker, 376 lbs. |
| Production rate | 3355 bbls. per day. |
| Moisture in raw kiln feed | 0.5%. |
| Excess oxygen in exit gases | 0.74%. |
| Relative humidity | Zero (for simplicity). |
| Heat items | B.t.u. above 80° F. |

THEORETICAL RAW KILN FEED COMPOSITION

| | Lbs. per Bbl. | Percent |
|---|---|---|
| $SiO_2$ | 88.74 | 15.20 |
| $Al_2O_3$ | 17.30 | 2.96 |
| $Fe_2O_3$ | 10.53 | 1.80 |
| $CaCO_3$ | 436.13 | 74.72 |
| $MgCO_3$ | 25.16 | 4.31 |
| $Na_2O$ | 1.13 | 0.19 |
| $K_2O$ | 1.88 | 0.32 |
| Free $H_2O$ | 2.92 | 0.50 |
| Total | 583.79 | 100.00 |

THEORETICAL CLINKER COMPOSITION

| | Lbs. per Bbl. | Percent |
|---|---|---|
| $SiO_2$ | 88.74 | 23.60 |
| $Al_2O_3$ | 17.30 | 4.60 |
| $Fe_2O_3$ | 10.53 | 2.80 |
| $CaO$ | 244.39 | 65.00 |
| $MgO$ | 12.03 | 3.20 |
| $Na_2O$ (Assuming no vaporization loss) | 1.13 | 0.30 |
| $K_2O$ (Assuming no vaporization loss) | 1.88 | 0.50 |
| Total | 376.00 | 100.00 |
| $C_3S$ | | 50.3 |
| $C_2S$ | | 29.8 |
| $C_3A$ | | 7.4 |
| $C_4AF$ | | 8.5 |

THEORETICAL HEAT BALANCE

| | Input (B.t.u./Bbl.) |
|---|---|
| Natural Gas Fuel, 928,000 High Heat Value, Low Heat Value | 839,575 |
| Exothermic Heat of Clinker Formation | 74,500 |
| Air from Cooler (601.97 Lbs. @ 1000° F.) | 146,636 |
| Air from Atmos. (66.89 Lbs. @ 80° F.) | |
| Total Input | 1,060,711 |

| | Output (B.t.u./Bbl.) |
|---|---|
| Clinker discharge @ 2,500° F | 236,504 |
| Exit gases @ 1,200° F | 282,326 |
| Vaporize water from raw feed | 3,133 |
| Calcine $CO_2$ from $CaCO_3$ | 302,923 |
| Calcine $CO_2$ from $MgCO_3$ | 14,366 |
| Shell radiation loss by difference | 221,449 |
| Total Output | 1,060,711 |

These data, portions of which have been assumed, do not necessarily represent optimum conditions, particularly in regard to fuel consumption.

Computations based on these data have been made to develop the steady state heat profile curves. An analysis of the general character of these curves is given by FIG. 1. The curves for $t_G$ (gas temperature) and $t_S$ (solids temperature) have been calculated or determined as accurately as possible. The curve $t_L$ (lining temperature) is in the main an approximation based on judgment. Its general shape is probably as shown, but the absolute values may be somewhat in error. To some extent the curves are idealized between computation points: i.e., they are not rounded at all transition points.

Description of Zones of the Kiln

Under equilibrium conditions there are seven distinct zones (one is comprised of two sub-zones) of influence within the dry-process kiln; each performing a function different from those of the other zones. Wet process kilns have eight zones. If uniform operation is to be achieved, the terminal conditions of these zones must be kept essentially uniform, and constantly in the same physical positions relative to themselves and to the kiln dimensions. The zones are identified as follows:

Zone:
    A—Pre-ignition zone
    B—Flame zone
    B'—Post-clinker zone  } Comprise the flame zone
    B"—Full exothermic zone
    C—Partial exothermic zone
    D—Boiling zone
    E—Sticky zone
    F—Partial calcining zone
    G—Pre-heat zone
    H—Chain system zone (wet-process kilns only)

Since the profile of the gas temperature curve is of paramount importance, the zones and the distances along the kiln are designated to proceed from the discharge end toward the feed end. This is a convention not accepted by many authorities, due to the fact that the product flow is in the reverse direction. As a partial compromise, the zones will first be described briefly in the direction of product flow, and then in more detail in the direction of the gas flow.

*Zone G.*—The only functions here are to drive free moisture from the solids and to preheat them to as high a temperature as possible before calcination starts at point 7. No appreciable calcining work occurs in Zone G.

*Zone F.*—At point 7 is the minimum gas temperature (about 1600° F.) which will support any appreciable calcination through direct contact of gas with the solids. Proceeding toward point 6, the gas temperatures become higher and higher, thus promoting ever increasing radiation transfer potential. However, this is a relatively long zone, requiring almost one-half the kiln length to perform one-third or less of the endothermic work of calcination. The solids are only gently disturbed by the rolling action of the kiln, and the gas temperature is still so low that it can radiate heat only into a relatively thin layer of the exposed solids surfaces. This layer calcines and forms an insulating barrier against transfer of heat from the gas and the lining into the center of the gyrating solids mass. Only as unreacted particles are slowly migrated to the surface can the work energy transfer proceed. Meanwhile, the whole mass is slowly building up its sensible heat reserve in preparation for events to follow.

*Zone E.*—From points 6 to 5, calcination proceeds in much the same fashion as in Zone F. However, at about 1400° F. the solids reach a "tacky" state which is retained throughout Zone E. Probably there are liquids-solids reactions involving the iron and alumina phases. Other evidence has indicated that some if not all of the $C_3A$ and $C_4AF$ are formed in this area. These being low level reactions, no major heat evolution or consumption is involved. Due to the tacky nature of the materials, the angle of repose and thereby the transport velocity are probably higher than in Zone F. As the solids leave Zone E at point 5, approximately one-half calcination has been completed.

*Zone D.*—At point 5 the solids have reached an average temperature of about 1590° F. and contain sufficient sensible heat so that the continuing external heat supplied from the gas in Zone D supports violent ebullition or fluidization. In this condition the load is an efficient acceptor of energy because new and unreacted particles are constantly and rapidly being subjected to radiation from the gases, and to conduction from the lining. This "sponging" effect explains the lowered lining and kiln shell temperatures throughout Zone D. Like all boiling mixtures, this one maintains essentially a constant temperature until all endothermic work is completed at point 4 and at a temperature of about 1650° F. The solids angle of repose is probably nil; however, the load in this zone has the highest transport velocity of any in the kiln due to the fluidized state thereof.

*Zone C.*—At point 4 the load requires no more endothermic heat, so it rapidly acquires sensible heat up to the equivalent of the exothermic reaction temperature of 2372° F. Some portion of the solids surfaces reaches the reaction temperature before the average of the total load can do so. The resulting exothermic reactions are non-triggering, but are sufficient to provide the melt for coating formation of about the same thickness as the rest of the clinkering zone below. In fact, point 4 is a trouble spot for ring formation when the kiln is allowed to cycle. Point 4 then becomes alternately subjected to the melt of Zone C and then to the overlapping refrigeration by encroachment of Zone D into Zone C. Such endothermic on top of exothermic reactions as then occur are known to lead to back rings of large magnitude if the cycling is continuous and extended. At point 4 and toward point 3, the lining temperature has started on a rather precipitous rise because of the lack of the efficient conduction transfer area of Zone D. The maximum lining temperature ($t_{LM}$) is reached at point 3.

*Zone B".*—At point 3 the average solids contain the sensible energy equivalent to the theoretical exothermic reaction temperature ($t_{SE}$) at 2372° F. From here on the mass will perform spontaneously due to its own internal heat evolution and will irreversibly arrive at the theoretical maximum solids temperature ($t_{SC}$) at about 2812° F. However, the mass is also unavoidably receiving energy from the gas stream at the same time which is reflected as "superheat" in the actual maximum solids temperature ($t_{SM}$) which is somewhat higher than the theoretical maximum ($t_{SC}$). The amount of this "superheat" is a very critical item, and is a safety factor which will be discussed in more detail later.

*Zone B'.*—At point 2 the solids have just statred the decline from their maximum temperature $t_{SM}$. There is conduction from solids to lining, and radiation from solids and lining to the incoming gases. This transfer is slight, however, since Zone B' is a portion of the overall frame Zone B.

*Zone A.*—In Zone A the solids and lining lose heat at an ever increasing rate to the unignited gas and air stream entering the kiln.

The zones will now be discussed in the more important direction of the gas stream flow.

*Zone A.*—By radiation from the solids and lining the entering gas and air stream is heated to its minimum ignition temperature, approximately 1170° F. in the case of natural gas fuel. The length $L_1$ of Zone A, from the nose of the kiln (8 ft. in the selected example) determines the point of first ignition. Actually there is some minor cone of flame in Zone A, but it does not occupy the full area of the kiln cross section as it does in the later regions where extreme turbulence exists. All of the flame is assigned to the total volume of Zone B, thus, making Zone A into an effective distance of non-flame conditions. This is a simplification which aids the theoretical deliberations without seriously affecting the accuracy of analysis. The length $L_1$ is of major importance as will be seen in subsequent discussions.

*Zone B.*—The length of the flame Zone B is the sum of the length of the two sub-zones B' and B". Due to the extreme turbulence, one may consider this zone to be completely occupied by a so-called cylinder of flame of length $L_F$, particularly so in the case of natural gas fuel.

*Zone B'.*—After ignition at $L_1$ (point 1), the flame proceeds rapidly through $L_2$ (point 2), and terminates at $L_3$ (point 3). On their course from point 1 to point 2, the gases continue to pick up some small amount of heat energy from the solids and lining. The distance $L_2$ from the nose or an inlet defines the critical point at which the gas, solids, and lining temperature curves all cross at essentially a common point. For all practical purposes this occurs at the point of maximum solids temperature $t_{SM}$. Actually, the gas temperature is very slightly higher than $t_{SM}$ at the point of crossing, in order to provide the amount of radiation transfer called for by the shell losses at this point. For the same reason the lining temperature is slightly lower than $t_{SM}$ at this point. However, these deviations can be considered as insignificant to proper analysis of the problem at hand. The temperature $t_{SM}$ and its physical position $L_2$ define the most critical point in the kiln, and the one most deserving of maximum attention, since for all practical purposes the constancy of this point fixes the remainder of the gas temperature profile.

*Zone B".*—From point 2 to point 3 the flame process is completed and the gas arrives at its maximum temperature $t_{GM}$. The gases are radiating energy to the solids, and also to the lining in this zone. The point $t_{GM}$ should coincide in location with the spontaneous exothermic point $t_{SE}$ on the solids curve, for it is here that the solids need that last increment of heat addition necessary to initiate full exothermic reaction. Also, physical coincidence of these two points optimizes the "superheat" in $t_{SM}$.

It is interesting to note the major effect which a shift in the gas curve at point 2 can have on this condition of coincidence. Economic and other reasons dictate that the "superheat" in $t_{SM}$ be held to a minimum. However, if the gas curve crosses the solids curve too late at a point too close to $t_{SE}$, the kiln may eventually "go into the hole" i.e. full exothermic reaction may not be achieved. This results because the solids will not then achieve the energy level equivalent to $t_{SE}$ at point 3. Thus, $t_{SM}$ must be made to occur at a temperature above $t_{SC}$ at all times, and how far above depends on the safety factor required and the economy desired. From point 2 to point 3 the lining temperature proceeds upward, and reaches its maximum $t_{LM}$ at point 3. The length $L_3$ from kiln nose to point of maximum gas temperature is defined by the following equation:

$$L_3 = L_1 + L_F$$

*Zone C.*—From point 3 to point 4 the gas temperature has started its decline, and is now irretrievably beyond control. If the gas profile has not been conditioned properly in Zones A and B, it in turn will not function correctly in the remainder of its path. As mentioned previously, the solids in Zone C are particularly susceptible to the encroachment and retreat of the boiling Zone D. This latter is brought about by shifts in the gas temperature levels in Zones C and D.

*Zone D.*—From the solids standpoint, this zone is the worst trouble maker in the whole kiln; notwithstanding the fact that it is also the most efficient zone in the kiln, and in fact, it is because of this efficiency that trouble arises. Noting that the decline of the gas profile is here at its maximum rate, one might imagine a small shift of the gas profile to the right. This will cause an extension of Zone D into Zone E, thus causing an excess of solids flow into Zone C. This occurs because the transport velocity in Zone D depends only on fluidization. At the same time, $T_{SM}$ at point 2 is being lowered due to the rightward shift of the gas profile. Thus, cooling effects on the solids now operate toward one another from the extremity points 2 and 4. If the gas profile goes uncorrected, trouble begins, for the air temperature from the cooler will eventually drop, thus delaying ignition and throwing the gas profile farther to the right; even though there are some compensating effects due to reduced gas velocity. Perhaps some help can be gained by reducing the kiln draft, which move will shift the gas curve to the left. However, high excess oxygen cannot economically be maintained all of the time just so some is available to cut off when the need arises. The increased load in Zone C chokes off some gas flow, so probably there is no oxygen available to burn more fuel. Actually, providing more fuel is not acceptible because the increased gas velocities would pull the gas profile further right.

Of all the corrective moves which logic might tell one to make, slowing the kiln speed is probably the worst. With the same fuel flow and a reduced counterflow of solids the gas profile cuts further into Zone E and converts it into Zone D thus promoting the flow of more relatively cold and unprepared material into Zone C just when this is not desired. Critical points $t_{SE}$ and $t_{SC}$ are soon completely violated and control is lost. Secondary air temperature will drop at an alarming rate, just when high heat levels are needed. Eventually, the condition will presumably correct itself due to a downward collapse of the whole gas profile causing the encroachment of Zone D into Zone E to cease. Meanwhile, however, it has been necessary to tolerate 30 to 60 minutes of non-equilibrium operation and a solids overload still exists in Zones B', B" and C. Subsequently it is suddenly realized that the latter has been removed, and due to the immediately previous depletion of solids in Zones D and E a very light and a very hot load now comes into Zones C and B". It is then too late to get the kiln speed back on (or the fuel off) fast enough to keep from upsetting the system in the opposite direction, for now the gas profile will rapidly shift back to the left. The deficiency of solids in Zones D and E causes the gas profile to raise rapidly in these regions, and also in Zones F and G. The gas profile is now so badly out of phase and there are so many "wrinkles" in the kiln that soon the whole vicious cycle will start all over again.

*Zone E.*—At point 5 the gas profile assumes a more gradual decline through Zone E, and the decline rate becomes progressively lower and lower throughout the remainder of the gas path. This is because the solids are in a semi-stagnant state and thereby are relatively poor acceptors of radiant energy except on the exposed solids surfaces. For a similar reason, the lining temperature makes a sudden transition upward at point 5 and assumes a new elevated position from which it starts its decline toward the feed end.

*Zone F.*—It is thought that by some relationship yet unknown, the rate of gain of sensible energy by the solids in Zones F and E is a constant function of the rate of calcination at all points.

*Zone G.*—If the above hypothesis is true, then the amount of sensible energy (as indicated by average temperature) contained by the solids at the point of first calcination (point 7) determines the percentage amount of the total calcination which will subsequently occur in the efficient boiling Zone D. This then illustrates the important effect which Zone G has upon Zone D, and upon the overall efficiency of the system.

Referring again to FIG. 2, and coming to the description of novel apparatus with which the invention is in part concerned. One type of auxiliary air heater is shown at 50 in the throat region of the clinker cooler so as to be directly in the path of the preheated air stream flowing to the downstream end of the kiln. While the heater may take different forms, it is shown in FIG. 2 merely for purposes of illustration as a gas burner to which gas is supplied through a line 51 in which an orifice meter 52 is connected for metering measurement purposes. As shown, line 51 may be supplied by either of lines 53 and 54, line 53 delivering a side stream of gas from the main conduit 39 and through a control valve 55, and line 54 delivering an independent side stream of gas through a control valve 56.

The purpose of the heater 50 is to controllably and additionally heat the incoming or secondary air prior to combustion of the main fuel stream in the kiln, thereby to control or adjust the combustion within the kiln to vary the regional location lengthwise of the kiln at which the hot gas reaches temperatures in excess of the materials maximum temperature. As a result the temperature and the movement of the materials in the kiln may be controlled, and particularly that movement of materials associated with fluidization thereof in the critical zone generally shown at 57 in FIG. 2, Zone 57 corresponding to Zone D in FIG. 1.

In accordance with the invention, it is contemplated that equilibrium conditions may be produced and maintained to best advantage, and with least deviation from optimum, by maintaining the speed of kiln rotation substantially constant during the adjustment of flaming combustion, by maintaining the flowage of the main stream of fuel into the kiln substantially constant while the flowage of the side stream of fuel through line 51 is increased or decreased as required, by maintaining the same flow rate of raw materials into the kiln at 11, and by maintaining essentially the same volumetric flow of air into the clinker cooler through the conduit 25, for preheating and ultimate flow to the kiln. Such preheating of the air by the clinker is such as to raise the temperature of the air above 1000° F. prior to the increased or decreased heating effect accomplished by operation of the auxiliary burner 50. Furthermore, under equilibrium conditions it is desirable that the preheating of the air by the clinker be stabilized as respects the temperature of the air flowing upwardly from the clinker bed, whereby the auxiliary heater 50 may be operated as a fine temperature control to smooth out any fluctuations in air temperature.

Figure 2:
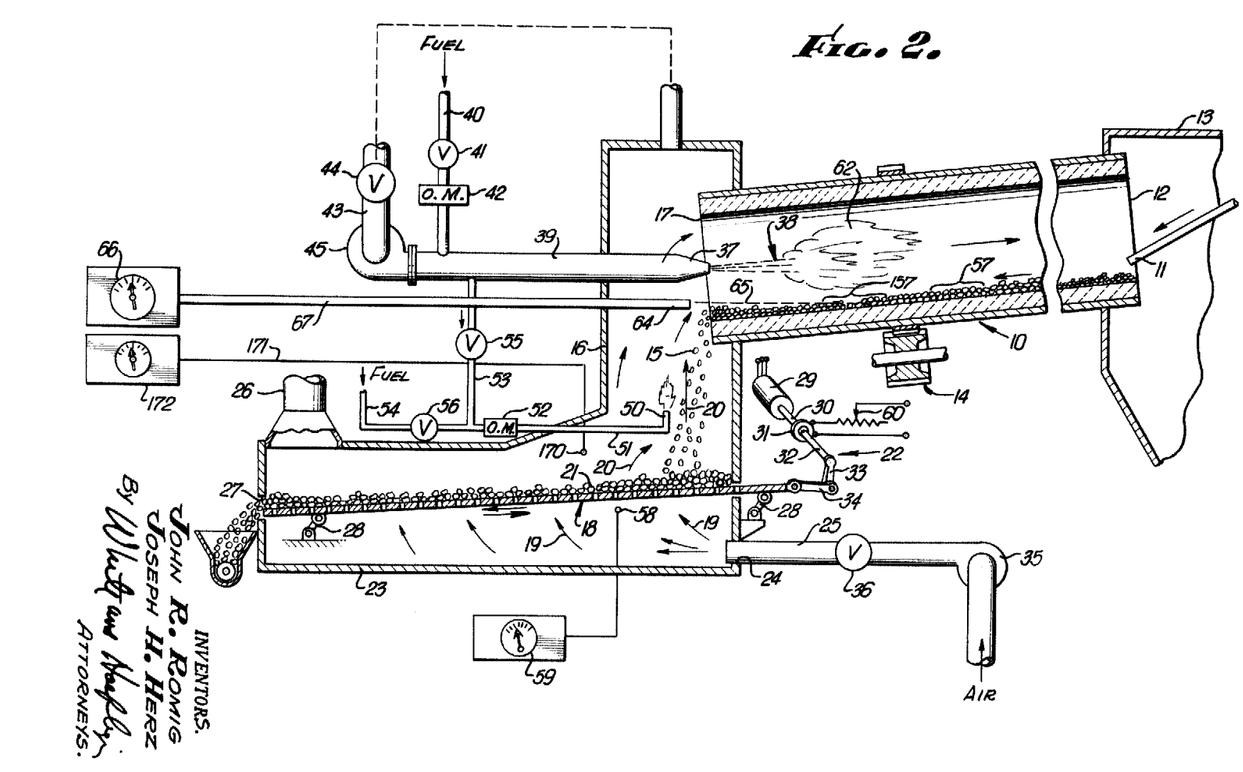
FIG. 2 is a vertical section through a kiln system showing the apparatus by which the improvements may be effected.

For purposes of achieving primary stabilization of the air preheat temperature, the movement of grate 18 is varied in response to pressure changes of secondary air, as for example as shown in FIG. 2. Thus, a pressure sensing device 58 may be located beneath the grate 18 and the pressure conditions may be viewed on a meter or instrument 59. Also, the speed of grate movement may be controlled by a magnetic clutch 31 in the drive 22, or an equivalent device, the energization of the clutch being controlled electrically as by the rheostat 60. Accordingly, the operator may control the rheostat and thus the drive to decrease or increase the speed of grate movement in response to a decrease or increase respectively in the secondary air pressure, as measured before the air passes through the clinker received on the grate. In this connection, it will be understood that a stable preheat temperature of the air passing through the clinker bed is associated with a stable thickness. If for any reason there should occur an increased discharge of clinker from the kiln, this change will result in a changed pressure as measured by the device 58 so that the operator may then adjust the grate drive in such manner as to adjust the bed thickness to reestablish the desired pressure, to which the desired stabilized preheat temperatures are related. A thermocouple 170 located above the bed 21 in the cooler 23 is connected at 171 to a meter or instrument 172 on which the operator can view the temperature conditions and adjust the bed thickness in accordance therewith. This temperature is also used in making corrective steps to increase or decrease the fuel flow to the auxiliary burner 50 to correct for any variation in secondary combustion air temperature. For example, when the observed temperature in the cooler is falling, or has fallen, such conditions being associated with decreased temperature of the solids 15 discharged from the kiln end 17, the operator will increase the fuel flow on the auxiliary burner 50 to compensate for such deficiency.

Figure 1:
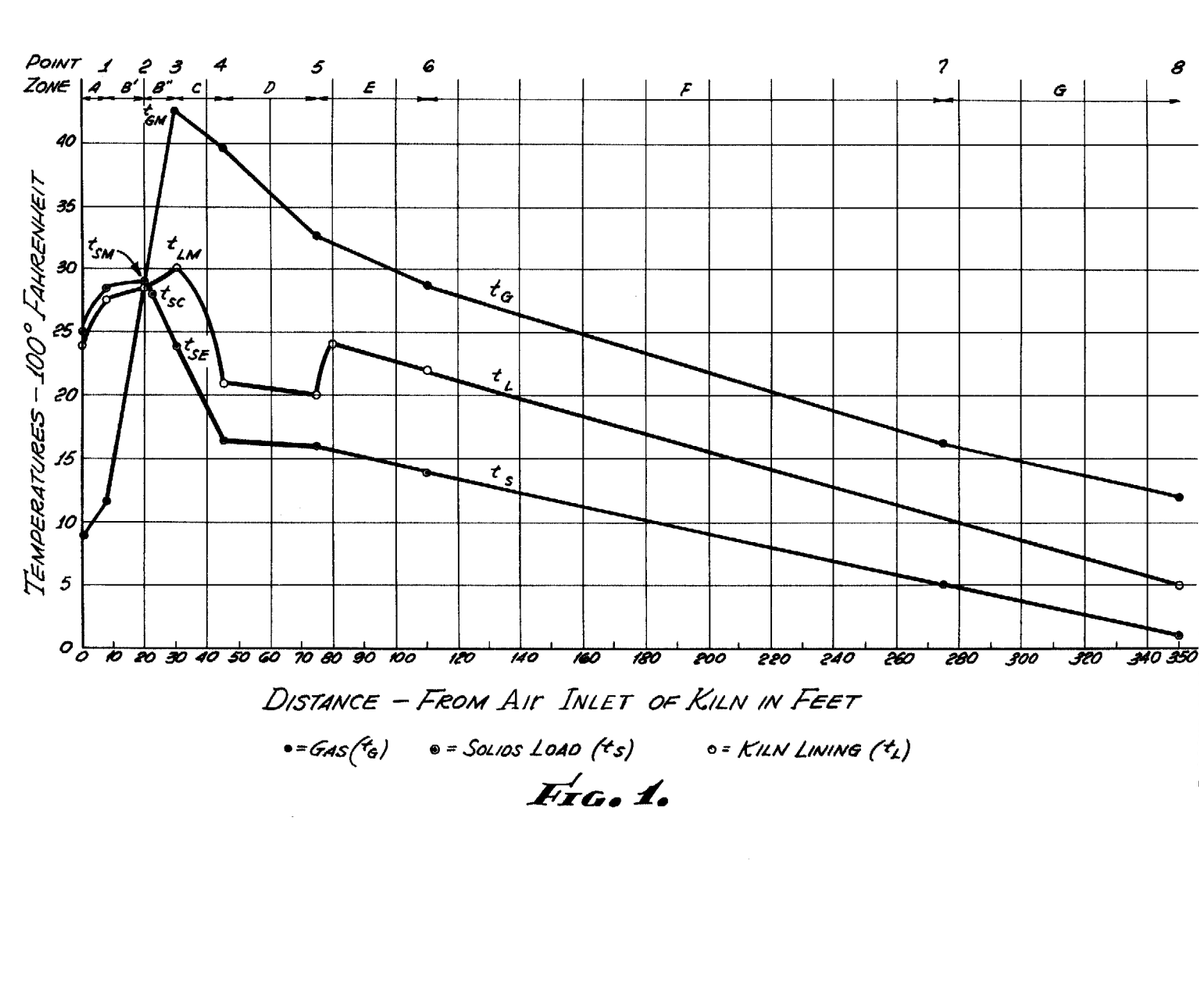
FIG. 1 is a graph showing temperature profiles along the length of a typical kiln.

Recalling again what was said in connection with the description of FIG. 1, it will be understood that local changes in the downstream movement of materials in the kiln in response to fluidization within the critical zone shown at 57 in FIG. 2, tend to disturb the heat transfer conditions within the kiln in such manner as to amplify the tendency for materials to so move. For example, an observed increase in the rate of movement of materials through the fluidization zone and toward the downstream end of the kiln results in the lowering of the total heat level in the exothermic area, which thereby causes a later fuel ignition, i.e. a shifting of of the ignition point 38 further from the downstream end 17 of the kiln. This in turn results in the physical lengthening of the tip of the flame 62, and the heat level in the fluidization zone 57 of the kiln is increased, which tends to produce a further increase in the rate of flow of materials from and through the fluidization zone. If these chain reactions are not suitably dealt with, there results what is commonly known as the "loss of the kiln" previously referred to.

In accordance with the invention, the combustion of the fuel with the incoming air is adjusted to vary the heat transfer in the kiln in such manner as to counter the amplified tendency for materials to move at faster or slower rates through the critical zone, and specifically, the combustion is adjusted to effect a downstream or upstream displacement of the ignition point 38. This adjustment also effects a downstream or upstream displacement of the regional location lengthwise of the kiln at which the hot gas reaches temperatures in excess of the materials maximum temperature.

More specifically, the combustion is adjusted by effecting an increase or decrease in the temperature of air passing into the kiln, as by controlling the amount of fuel passing to line 51 and delivered to the auxiliary burner 50. To accomplish this, the means for effecting a displacement of the combustion ignition point typically includes temperature sensing apparatus for sensing changes in the downstream materials temperature conditions in the kiln causatively related to the amplified tendency for materials to move within the zone 57. Such temperature sensing apparatus may include a temperature sensing device 64, as for example a pyrometer, or Rayotube, or light pipe directed to receive rays 65 emanating from the clinkering zone area 157 at or near the maximum solids temperature $t_{SM}$. A suitable temperature indicating meter 66 is connected to the device 64 by line 67, so that the operator may visually observe the instrument 66 to ascertain the maximum solids temperature conditions. Knowing these, the operator may then adjust the valves 55 or 56 to vary the fuel delivery to the auxiliary burner in such manner as to control the temperature at 157 and the movement of materials within zone 57.

For example, if the observed temperature conditions at 157 are falling, or have fallen, such conditions being associated with an increased movement of materials within zone 57 toward the downstream end of the kiln, the operator will then counter this increased movement of materials by opening valves 55 or 56 to admit more fuel to the burner 50 for effecting increased heating of the incoming air and thereby effect a downstream displacement of the combustion ignition point 38 sufficient to restore the desired temperature conditions at 157 and within the zone 57. Alternatively, an upstream displacement of the combustion ignition point may be brought about in response to an observed increase in the temperature conditions at 157. Actual operation of the kiln according to these principles has been found to be entirely successful and to eliminate for all practical purposes conditions otherwise leading to the "loss of the kiln."

Figure 3:
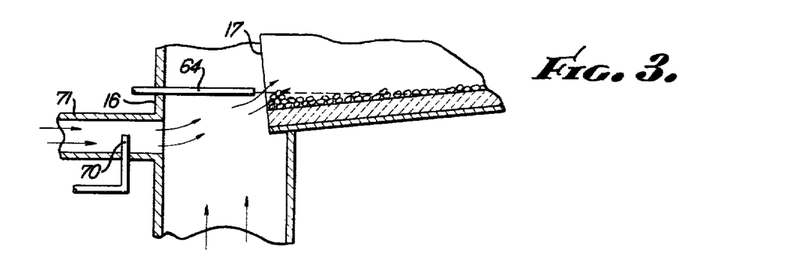
FIG. 3 is a fragmentary elevation showing a modification of the apparatus.

FIG. 3 shows an alternative placement of the auxiliary burner 70 within a duct 71 conveying a side stream of air into the hood 16 to mix with the main stream of incoming air flowing upwardly toward the downstream end 17 of the kiln.

Figure 4:
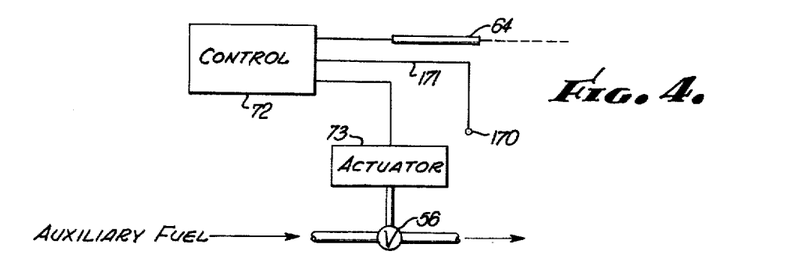
FIG. 4 illustrates how the improved kiln operation may be automated.
Figure 5:
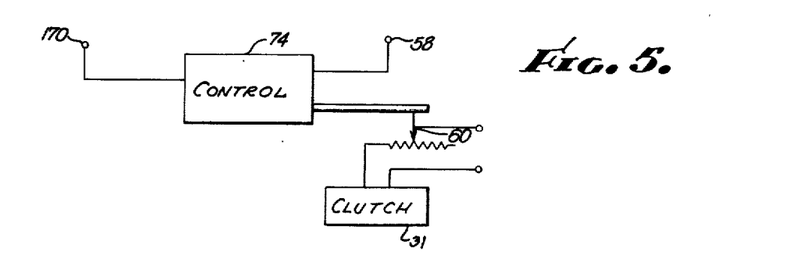
FIG. 5 shows how improved kiln operation may be automated in a modified manner.

Finally, FIG. 4 shows a schematic control 72 for operating an actuator 73 for the valve 56 in response to signals transmitted to the control 72 by the devices 64 and 170. The control 72 will be understood as being typically mechanical or electrical in nature, and characterized as a form of automated control. FIG. 5 shows a similar control 74 responsive to signals from the pressure sensing device 58 to actuate the rheostat 60, as described above. The control 74 is biased by the temperature sensing device 170 which is located in the cooler 23. Controls 72 and 74 will be understood as automatically operable to adjust the fuel flow to the auxiliary burner and to adjust the grate drive 22 in the manner discussed above in connection with normal operation of these devices, to bring about the desired results referred to.

We claim:

1. In the process where calcareous and argillaceous materials are formed into clinker by treatment with hot gas flowing upstream in a rotary kiln, the materials undergoing calcination, fluidization and exothermic reaction while they move downstream through different zones in the kiln and the materials moving downstream in response to kiln rotation and local fluidization in said fluidization zone, changes in the downstream movement of materials in response to said fluidization tending to disturb said heat transfer in such manner as to amplify the tendency for materials to so move, the steps that include passing a main stream of combustible and air into the kiln for flaming combustion therein and for upstream hot gaseous flow in heat transfer relation with materials in said exothermic reaction zone, said fluidization zone and said calcination zone, and adjusting said flaming combustion by effecting increased or decreased heating of said air prior to said combustion to vary said heat transfer in such manner as to counter said amplified tendency for materials to so move, said increased or decreased heating of the air prior to combustion being carried out by controllably combusting a side stream of combustible for controllably heating and changing the temperature of the air before it flows into the kiln.

2. The method of claim 1 in which said combustibles are carbonaceous and flowable.

3. The method of claim 1 in which the flowage of the main stream of combustible into the kiln is kept substantially constant while the flowage of said side stream of combustible is increased or decreased as required.

4. The method of claim 1 including maintaining the speed of kiln rotation substantially constant during said adjustment of flaming combustion.

5. The method of claim 1 including preheating the air to temperatures above 1,000° F. prior to said increased or decreased heating thereof, by flowing the air outside the kiln in heat transfer relation with hot clinker discharged from the kiln.

6. The method of claim 1 including preheating air prior to delivery thereof to the kiln and to temperatures above 1,000° F. by flowing the air in heat transfer relation with a bed of hot clinker discharged from the kiln, and primarily controlling said preheat temperature by increasing or decreasing the clinker bed thickness.

7. The method of claim 6 including substantially stabilizing the air temperature after said primary control of the preheat temperature by adjusting the flowage of said side stream of combustible.

8. The method of claim 6 including adjusting the air temperature after said primary control of the preheat temperature, by adjusting the flowage of said side stream of combustible, thereby to adjust the regional location lengthwise of the kiln at which the hot gas reaches temperatures in excess of the materials maximum temperatures in the kiln.

9. The combination with apparatus including a kiln and wherein materials are formed into clinker by treatment with hot gas flowing upstream in the rotary kiln, the materials undergoing calcination, fluidization and exothermic clinkering reaction while they move downstream through different zones in the kiln, means for supplying air and a combustible into the kiln for combustion therein and for upstream hot gaseous flow in heat transfer relation with materials in the kiln, means for detecting substantially the maximum temperature of the materials in the clinkering zone, and means for effecting a downstream shift of the region where flaming combustion begins in response to a decrease in said detected temperature and while said first named means maintains substantially constant said supplying of combustible and air for combustion in the kiln.

10. The invention as defined in claim 9 in which said first named means includes for receiving clinker discharged from the kiln and for flowing air in heat transfer relation with said discharged clinker to raise the temperature of said air prior to supply thereof to the kiln, and in which said last named means includes an auxiliary heater in said chamber in the path of air flow to the kiln, said heater being controllable to increase the air temperature sufficiently to effect desired displacement of the combustion initiation point.

11. The invention as defined in claim 10 in which said heater comprises auxiliary fuel burner means outside the kiln.

12. The invention as defined in claim 11 in which said auxiliary fuel burner means is located in said chamber in the direct path of air flow preheated by said clinker.

13. The invention as defined in claim 11 in which said auxiliary fuel burner means is located in said chamber in the path of auxiliary air flowing to merge with said air flow preheated by said clinker, and including conduit means for said auxiliary air flow.

14. In combination with apparatus including a kiln and wherein materials are formed into clinker by treatment with hot gas flowing upstream in the kiln, the materials undergoing calcination, fluidization and exothermic reaction while they move downstream through different zones in the kiln, a local change in the downstream movement of materials in response to said fluidization tending to disturb said heat transfer in such manner as to amplify the tendency for materials to so move, means for passing air and a combustible into the kiln for combustion therein and for upstream hot gaseous flow in heat transfer relation with materials in the kiln, and means for effecting downstream displacement of the combustion initiation point to vary said heat transfer in such manner as to counter said amplified tendency for materials to so move, said last named means including temperature sensing apparatus for sensing changes in the downstream materials temperature conditions in the kiln causatively related to said amplified tendency for materials to so move, said last named means being operable to effect a downstream displacement of the combustion initiation point in response to decreased materials downstream temperature conditions and to effect an upstream displacement of the combustion initiation point in response to increased materials downstream temperature conditions, a chamber for receiving clinker discharged from the kiln and for flowing air in heat transfer relation with said discharged clinker to raise the temperature of said air prior to supply thereof to the kiln, said last named means including an auxiliary fuel burner means in said chamber in the path of air flow to the kiln and controllable to further increase the air temperature sufficiently to effect desired displacement of the combustion initiation point, said means for effecting said displacement of the combustion initiation point including apparatus for effecting an increase or decrease in fuel delivery to said auxiliary burner means in response to a decrease or increase respectively in the materials downstream temperature conditions in the kiln, causatively related to said amplified tendency for materials to so move.

15. The invention as defined in claim 14 in which said apparatus includes a temperature sensing device for producing a signal that varies with changes in said downstream temperature conditions in the kiln, a valve through which fuel is delivered to said auxiliary burner means, and other means controlling said valve in response to changes in said signal.

16. In combination with apparatus including a kiln and wherein materials are formed into clinker by treatment with hot gas flowing upstream in the kiln, the materials undergoing calcination, fluidization and exothermic reaction while they move downstream through different zones in the kiln, a local change in the downstream movement of materials in response to said fluidization tending to disturb said heat transfer in such manner as to amplify the tendency for materials to so move, means for passing air and a combustible into the kiln for combustion therein and for upstream hot gaseous flow in heat transfer relation with materials in the kiln, and means for effecting downstream displacement of the combustion initiation point to vary said heat transfer in such manner as to counter said amplified tendency for materials to so move, a chamber and a moving grate for receiving clinker discharged from the kiln and for flowing air in heat transfer relation with clinker received on the grate to raise the temperature of said air prior to supply thereof to the kiln, said last named means including first apparatus for varying the grate movement in response to air pressure changes thereby to effect primary stabilization of said air temperature, and said last named means also including other apparatus to controllably combust a side stream of combustible for controllably heating and changing the temperature of the air before it flows into the kiln.

17. The invention as defined in claim 16 in which said first apparatus includes a variable speed drive for said grate, and means controlling said drive to decrease or increase the speed of grate movement in response to a decrease or increase respectively in the air pressure as measured before the air passes through said clinker received on the grate.

18. In the process wherein materials are subjected to treatment with hot gas flowing upstream in a rotary kiln, the materials undergoing clinker formation while they pass through a downstream zone in the kiln, the steps that include supplying air and a combustible into the kiln for combustion therein and for upstream hot gaseous flow in heat transfer relation with materials in the kiln, detecting substantially the maximum temperature of the materials in the clinkering zone, and effecting a downstream shift of the region where flaming combustion begins in response to a decrease in said detected temperature, said steps being carried out while maintaining substantially constant said supplying of combustible and air for combustion in the kiln.

19. In the process wherein calcareous and argillaceous materials are formed into clinker by treatment with hot gas flowing upstream in a rotary kiln, the materials undergoing calcination, fluidization and exothermic clinkering reaction while they move downstream through different zones in the kiln, changes in the downstream movement of materials in response to said fluidization tending to disturb said heat transfer in such manner as to amplify the tendency for materials to so move, the steps that include supplying air and a combustible into the kiln for combustion therein and for upstream hot gaseous flow in heat transfer relation with materials in said zones, detecting substantially the maximum temperature of the materials in the clinkering zone, and effecting a downstream shift of the region where flaming combustion begins in response to a decrease in said detected temperature, said steps being carried out while maintaining substantially constant said supplying of combustible and air for combustion in the kiln.

References Cited in the file of this patent

UNITED STATES PATENTS

| 2,014,941 | Lee | Sept. 17, 1935 |
| 2,068,574 | Smith | Jan. 19, 1937 |
| 2,104,883 | Morton | Jan. 11, 1938 |
| 2,111,783 | Hultz | Mar. 22, 1938 |
| 2,865,622 | Ross | Dec. 23, 1958 |

FOREIGN PATENTS

| 475,221 | Canada | July 10, 1951 |

UNITED STATES PATENT OFFICE
CERTIFICATE OF CORRECTION

Patent No. 3,091,442                                    May 28, 1963

John R. Romig et al.

It is hereby certified that error appears in the above numbered patent requiring correction and that the said Letters Patent should read as corrected below.

Column 12, line 14, after "includes" insert -- a chamber --.

Signed and sealed this 10th day of December 1963.

(SEAL)
Attest:

ERNEST W. SWIDER                              EDWIN L. REYNOLDS Attesting Officer                                 Acting Commissioner of Patents